United States Patent
Gaile

(10) Patent No.: US 7,520,494 B2
(45) Date of Patent: *Apr. 21, 2009

(54) SPRING ELEMENT

(75) Inventor: Anton Gaile, Leutkirch (DE)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 184 days.

This patent is subject to a terminal disclaimer.

(21) Appl. No.: 10/644,134

(22) Filed: Aug. 20, 2003

(65) Prior Publication Data

US 2005/0029064 A1  Feb. 10, 2005

(30) Foreign Application Priority Data

Aug. 20, 2002  (DE)  ................. 102 38 059

(51) Int. Cl.
*B60G 11/58* (2006.01)

(52) U.S. Cl. .......... 267/221; 267/226; 267/203; 267/34; 267/64.16; 267/64.18; 267/64.28; 188/322.21

(58) Field of Classification Search ......... 267/895, 267/201–203, 216, 218–222, 34, 35, 226, 267/225, 293, 64.13, 64.16–64.18, 64.25, 267/64.28, 186, 190, 195, 64.22; 188/266.2, 188/322.21

See application file for complete search history.

(56) References Cited

U.S. PATENT DOCUMENTS

| 4,858,898 A * | 8/1989 | Niikura et al. ............ 267/218 |
| 4,890,822 A * | 1/1990 | Ezure et al. ............. 267/64.23 |
| 4,921,227 A * | 5/1990 | Fukumura et al. ........ 267/64.23 |
| 5,342,023 A * | 8/1994 | Kuriki et al. ............ 267/64.17 |
| 5,769,400 A   | 6/1998 | Holzl et al. |
| 5,988,607 A * | 11/1999 | Beck ..................... 267/64.26 |
| 6,092,816 A * | 7/2000 | Sekine et al. ............ 280/6.159 |
| 6,360,674 B1  | 3/2002 | Schuller et al. |
| 6,416,061 B1* | 7/2002 | French et al. ............ 280/5.514 |
| 6,637,348 B1* | 10/2003 | Teichmann et al. ......... 105/453 |
| 6,695,294 B2* | 2/2004 | Miller et al. ............ 267/64.16 |
| 6,698,729 B2* | 3/2004 | Popjoy .................. 267/64.28 |
| 2002/0060384 A1 | 5/2002 | Kazmeier et al. |

FOREIGN PATENT DOCUMENTS

| DE | 1177438 | 9/1964 |
| DE | 4234523 | 4/1994 |
| DE | 4406607 | 9/1995 |
| DE | 19651138 | 6/1997 |
| DE | 198 15 197 C1 | 4/1998 |

(Continued)

*Primary Examiner*—Xuan Lan Nguyen
(74) *Attorney, Agent, or Firm*—Dilworth & Barrese, LLP

(57) ABSTRACT

A spring element with a hydropneumatic strut are positioned between the bogie and the body of a rail car, with the strut having a sliding piston in a cylinder, whereby the piston or the cylinder can be connected with the bogie and the other component can be connected with the body, and the piston area of the cylinder is connected with a hydraulic accumulator. A strut that is easy to service and maintain and does not accumulate any appreciable amount of dirt is created by virtue of the fact that the hydropneumatic strut has a hydraulic height regulator valve or a height sensor connected or connectable with a feedback loop, whereby the position of the piston in the cylinder can be adjusted or determined.

16 Claims, 9 Drawing Sheets

FOREIGN PATENT DOCUMENTS

| | | |
|---|---|---|
| DE | 29813031 | 11/1998 |
| DE | 19805896 | 7/1999 |
| DE | 10110878 | 9/2001 |
| DE | 10056929 | 5/2002 |
| EP | 0947409 | 10/1999 |
| EP | 1006036 | 6/2000 |
| GB | 870414 | 6/1961 |
| WO | 94/22702 | 10/1994 |

\* cited by examiner

SPRING ELEMENT

BACKGROUND OF THE INVENTION

The within invention concerns a spring element with a hydropneumatic strut to be positioned between the bogie and the body of a rail car, with the strut enclosing a piston that can slide in a cylinder so that the piston or the cylinder can be connected with the bogie and the other component can be connected with the body, and the piston space of the cylinder is connected with a hydraulic accumulator. A spring element of this type is known from, for example, WO 94/22702.

Spring elements of this type serving generally as secondary spring elements are known in a wide variety of embodiments. It is known how to adjust the strut height and hence the vehicle height, with height sensors being positioned between the car body and the bogie, by use of the sensors, the desired vehicle height is adjusted via a feedback loop. Sensors of this type become dirty, on the one hand, and on the other hand are positioned in such a way that changing them requires the disassembly or at least the removal of the strut. Another disadvantage of previously known height sensors is that in wheel wear equalization the sensor must be re-adjusted.

SUMMARY OF THE INVENTION

It is the task of the within invention to furnish a spring element of the type initially described that is easy to service and maintain and does not accumulate any appreciable amount of dirt.

The performance of this task starts with a spring element of the type initially described, in which the hydropneumatic strut has a hydraulic height regulator valve or a height sensor connected or connectable with a feedback loop, by means of which the position of the piston in the cylinder can be adjusted or determined. According to the invention, the height sensor or height adjustment valve is integrated into the strut, which is facilitated by, for example, the fact that the height sensor or the height regulator valve is inserted and screwed into the strut cylinder head. When the height sensor or height regulator valve is appropriately positioned, problem-free change or maintenance can be achieved without disassembly or removal of the strut itself. Because the piston position is determined, it is not necessary to readjust the height of the height sensor when wheel wear is equalized.

The height regulator valve and the height sensor can have a mechanical feedback that emits a signal, also or exclusively, in the adjustment area of the strut, which said signal depends on the position of the piston.

It is particularly advantageous if the mechanical feedback emits a signal dependent on the position of the piston exclusively in the strut adjustment area, while the position of the mechanical feedback loop remains constant above and below the adjustment area. If the strut is outside the adjustment area, it is merely determined if the strut is above or below the adjustment area. By means of this information the strut can be regulated in the adjustment area and the vehicle height can be established. By means of this simple method of mechanical signal reinforcement, on the one hand a sensor with a very short stroke can be used, and on the other hand the mechanical feedback loop can be positioned in such manner that it can easily be changed. Additionally, thanks to the short measurement displacement, the size of the sensor or height regulator valve is considerably reduced.

In a preferred embodiment, the stroke of the mechanical feedback loop is in proportion to the position of the piston in the adjustment area.

At least some sections of the piston can have a conical lug, with the mechanical feedback loop of the height regulator valve or the height sensor being in contact with at least the conical part of the lug surface and undergoing a deflection that is dependent on the position of the lug.

In another embodiment of the within invention, a bore extending in the longitudinal direction of the cylinder is positioned in the cylinder head, and the mechanical feedback loop of the height regulator valve or the height sensor is located in a bore extending perpendicular thereto in the cylinder head.

Additionally, an auxiliary spring can be integrated into the strut in such a way that the auxiliary spring does not increase the length of the strut. By means of this embodiment a spring element is created that offers maximum function with minimum need for space.

It is particularly advantageous if the auxiliary spring and the strut are arranged concentrically and the auxiliary spring encloses the strut cylinder. This creates for the auxiliary spring a relatively lengthy mounting area with a large diameter, which facilitates the housing therein of a spring element (rubber spring, coil spring, or disc spring) with a very characteristic curve. Another advantage is that the auxiliary spring can be preloaded, for example at vehicle unladen weight. In this embodiment, moreover, the auxiliary spring is free from lateral forces and lateral movements.

As described above, the auxiliary spring can be preloaded, for example at vehicle unladen weight or at partial unladen weight or even at maximum vehicle weight.

In another embodiment of the invention, the auxiliary spring is preloaded by means of a mechanical end stop or a hydraulic cylinder. The end stop can be, for example, a ram or ring that is supported on the strut cylinder and is mobile in relation to the cylinder. By means of the friction resistance between the cylinder and the end stop, the shock-absorption characteristic of the auxiliary spring operation can be influenced.

In the case of hydraulic-cylinder preloading, the auxiliary spring can be preloaded as needed. For example, in normal operation the auxiliary spring can be preloaded via hydraulic pressure to maximum vehicle weight. This creates the possibility of lowering the vehicle in normal operation below the auxiliary spring height, which is desirable in certain applications. If the hydraulic pressure falls, the spring descends because of the drop in pressure in the hydraulic cylinder, and is available for auxiliary operation.

If the hydraulic cylinder is connected with the strut-cylinder piston space, if the pressure drops in the strut-cylinder piston space the pressure in the auxiliary-spring hydraulic cylinder also drops automatically, and this releases the auxiliary spring. It must be ensured that the auxiliary spring is still completely preloaded at minimum working load (working pressure). This can be achieved via an appropriate choice of the piston surfaces of the auxiliary-spring hydraulic cylinder.

It is particularly advantageous if for wheel-wear equalization purposes there is an adjustment unit positioned in line with the strut, the height of which said adjustment unit can be adjusted in the direction of movement of the strut and which is supported on the strut cylinder or strut piston. The full height of the spring element and the vehicle can thereby be easily adjusted.

The adjustment unit can contain a piston inserted in an hydraulic cylinder, the height of which is adjustable in the longitudinal direction of the strut, and which is supported on the strut cylinder or strut piston. A separate piston space is thus used for the height adjustment. Wheel wear equalization by mechanical means, e.g. packing of shims, or extension of the shock-absorption piston of the strut, are not necessary in this solution. The arrangement according to the invention also ensures that the height of the auxiliary spring and the height sensor are adjusted automatically when the strut length is adjusted, so that post-adjustment is not necessary.

Adjustment of the hydraulic cylinder can be done manually (e.g., by means of a manual pump), or automatically, by means of a feedback loop.

Another embodiment of the invention has an equalizer pendulum, one end of which is connected with the strut piston and the other end of which is connected with the hydraulic-cylinder piston, the ends of the equalizer pendulum being spherical, so that the strut can move crossways to the direction of movement of the piston.

The within invention further concerns a spring element with a hydropneumatic strut to be positioned between the bogie and the body of a rail car, the strut having a piston that can slide in a cylinder, whereupon the piston or the cylinder can be connected with the bogie and the other component can be connected with the body, and the cylinder piston space is connected with a hydraulic accumulator. The overall height of the vehicle can easily be changed by means of an adjustable adjustment unit, aligned with the strut vertically in the direction of movement of the strut and supported directly or indirectly on the strut piston or strut cylinder.

The adjustment unit is designed preferably as an hydraulic unit.

The advantage offered by the inclusion of such an adjustment element is that when the length of the spring-element is adjusted for the purpose of wheel wear equalization, the height of the auxiliary spring and the height sensor or height adjustment valve is also adjusted.

In another embodiment of the invention, the spring element is designed according to the description herein.

The within invention also concerns a spring element with a hydropneumatic strut to be positioned between the bogie and the body of a rail car, the strut having a sliding piston in a cylinder, whereby the piston or the cylinder can be connected with the bogie and the other component can be connected with the body, while the piston area of the cylinder is connected with a hydraulic accumulator. In this embodiment of the invention, there is another spring element that is aligned with the hydropneumatic strut and which engages independent of the position of the strut piston. In normal operation, the shock absorption between the bogie and the body of the rail car is handled by the hydropneumatic strut and by the additional spring element.

The additional spring element can be designed as a coil spring or a rubber spring. In theory any standard spring element can be used.

The alignment of the hydropneumatic strut with an additional spring element offers the following advantages: The strut ends are able to slide laterally thanks to the additional spring element. The expensive pendulum support required in other solutions can be eliminated. The lateral rigidity of the strut can be influenced by the appropriate choice of the additional spring element in wide areas. The arrangement according to the invention is easy to build, sturdy, not prone to breakdowns, and inexpensive.

Additionally, the solution does not absolutely require an auxiliary spring, since the aligned spring element serves as an auxiliary spring if the hydropneumatic strut stops working, for example as the result of a line break, and shock absorption ceases.

Thanks to the alignment the hydropneumatic strut can be designed with a higher spring rate while the same traveling comfort is maintained. The consequence of this is that considerably smaller hydraulic accumulators, particularly nitrogen accumulators, can be used. Additionally, the spring displacements of the hydropneumatic strut are reduced by the alignment arrangement, since a portion of the necessary spring displacement is taken over by the additional spring element. The result is that the hydropneumatic system contains considerably less oil, so that the hydro-unit reservoir can also be much smaller. Lastly, thanks to this arrangement heights can be less than is the case with customary struts.

According to another embodiment of the invention, there is an end stop element designed to travel longitudinally in the direction of movement of the piston in the cylinder and by means of which the end position of the piston in the cylinder can be changed. In this way the overall height of the vehicle can easily be changed, for example by means of a manual pump or automatically. A fully automatic wheel wear equalization is possible. The auxiliary spring and the hydropneumatic spring are adjusted at the same time.

The end stop element can be positioned in the piston end that faces the piston space.

It is particularly advantageous if there is another piston space that is connected with the end stop element at its end that faces away from the cylinder piston space, and which contains or can contain a pressure fluid.

At least part of the end stop element can be held in a recess in the strut piston.

In a preferred embodiment of the invention, if the hydraulic pressure of the strut falls the additional piston space can be connected with a hydraulic accumulator containing hydraulic fluid. In this case the accumulator can contain a compressible gas. The result is a hydraulically preloaded auxiliary spring in the form of a compressible gas (nitrogen spring). With this solution as well, it is possible for the vehicle in normal operation to drop below auxiliary spring height. In auxiliary spring operation, the additional piston space is filled with a pressurized hydraulic medium. The end stop is thereby drawn out into, and is held in, the strut piston space. The spring effect results from the additional spring element. A backflow of the hydraulic medium in the additional piston space into the accumulator is prevented by a nonreturn valve.

Pressure-controlled valves can be provided to link the accumulator with the additional piston space if the hydraulic pressure in the strut falls below a predetermined figure. In normal operation these valves are held in closed position by the hydraulic pressure of the strut. The consequence of this is that the additional piston space is not connected with the accumulator. However, if the pressure in the hydraulic system of the strut falls, the hydraulic accumulator is released thanks to the preloading of the valves, whereupon the additional piston space is filled with the hydraulic medium.

The within invention also concerns a spring element with a hydropneumatic strut to be positioned between the bogie and the body of a rail car, with the strut enclosing a sliding piston in a cylinder, whereupon the piston or the cylinder can be connected with the bogie and the other component can be connected with the body, and the cylinder piston space is connected with a hydraulic accumulator. A particularly simple wheel wear equalization is achieved thanks to the presence of an end-stop element that is designed to slide longitudinally in the direction of movement of the piston and by means of which the end position of the piston in the cylinder can be changed. The height adjustment is thus integrated into the strut.

This means that the overall height of the vehicle can easily be adjusted (by means of manual pumps, or automatically).

Additionally, a fully automatic wheel wear equalization is possible (hydropneumatic spring and auxiliary spring being adjusted simultaneously.)

In another embodiment of the invention, the spring element is designed according to the description herein.

BRIEF DESCRIPTION OF THE DRAWINGS

Additional details and advantages of the within invention are explained in greater detail by means of an example of an embodiment illustrated in the drawing, which shows.

DESCRIPTION OF THE PREFERRED EMBODIMENTS

Figure 1:
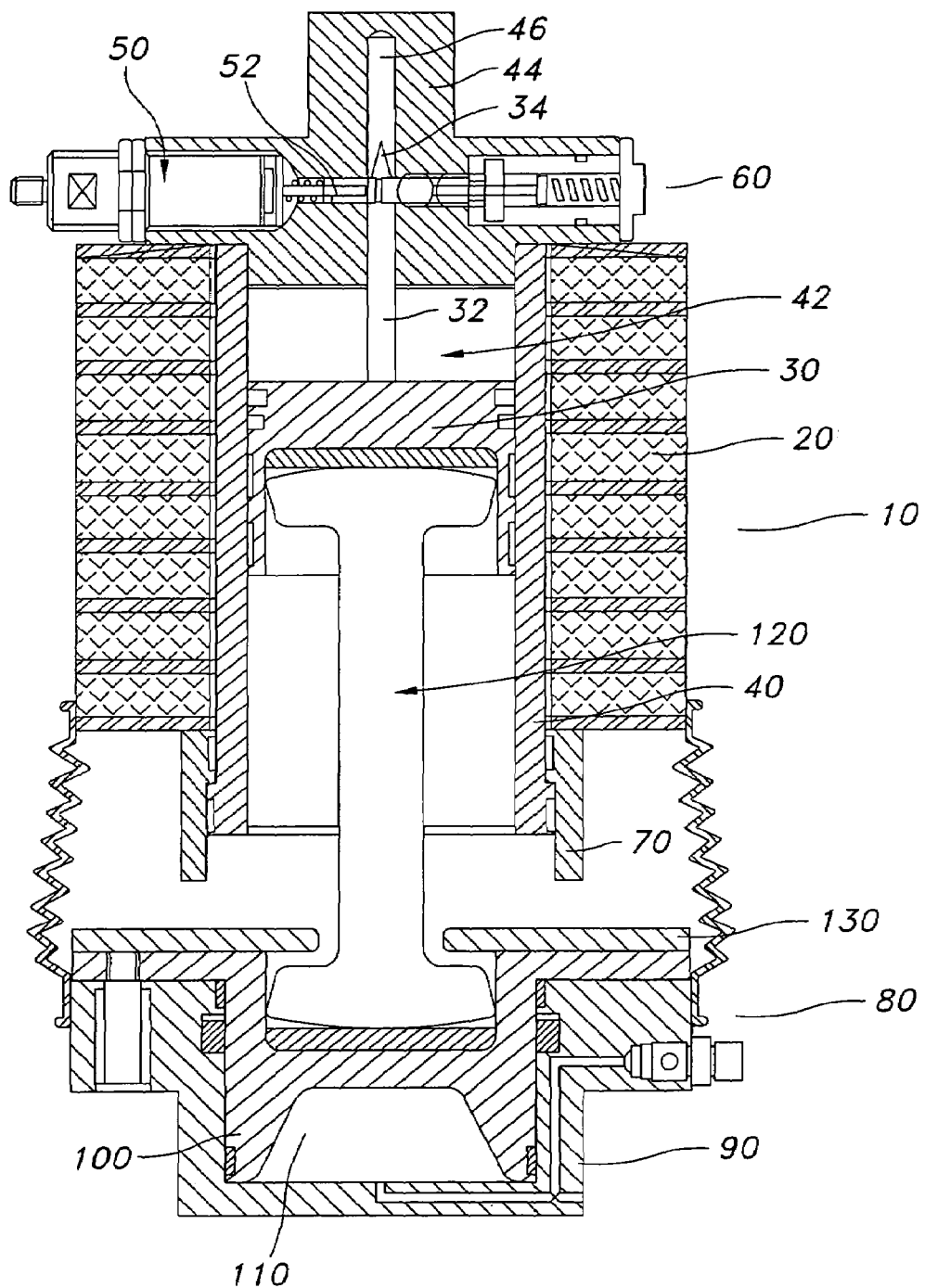
FIG. 1: Longitudinal section through a hydropneumatic strut with mechanical end stop, in a first embodiment.

FIG. 1 shows in longitudinal section a spring element 10 with an auxiliary spring 20 and a hydropneumatic strut (HP strut) to be positioned between the bogie and the body of a rail vehicle. The HP strut has a strut piston 30, which slides longitudinally in cylinder 40. In the pinston space 42 of cylinder 40 there is a hydraulic medium, preferably oil, which via connector 60 is connected with an hydraulic accumulator. Auxiliary spring 20 encloses the HP-strut cylinder 40.

Cylinder head 44 holds a height sensor 50, the mechanical feedback loop (displacement indicator) 52 of which is designed to move horizontally. Cylinder head 44 also has vertical bore 46, which holds mobile lug 32 connected with piston 30. Lug 32 has conical area 34.

Cylinder 40 has at its lower end ring 70, which can be moved against a friction resistance relative to cylinder 40 to an end stop that hold ring 70 in the lowest position. Auxiliary spring 20 presses ring 70 against the cylinder 40 end stop. Auxiliary spring 20 is preloaded at about 90% of the unladen weight of the vehicle.

The bottom portion of FIG. 1 shows adjustment unit 80, which has a cylinder 90 holding sliding hydraulic cylinder piston 100. Hydraulic cylinder piston 100 and cylinder 90 delimit a piston space 110 into which a pressurized medium can be introduced. Between hydraulic cylinder piston 100 of adjustment unit 80 and piston 30 of the HP strut there is pendulum support 120, which supports the HP strut in such manner that lateral movements are also possible.

Hydraulic cylinder piston 100 has on its side that faces the HP strut a stop plate 130.

During operation, mechanical feedback loop 52 of height sensor 50 calipers the surface of lug 32 of piston 30. In the conical area 34 the mechanical feedback loop 52 is in proportion to the vertical deflection of lug 32 and is thus moved into the position of piston 30. Above and below area 34 the position of the mechanical feedback loop 52 does not change when lug 32 is moved. In this area the height sensor 50 merely reports that lug 32 is above or below the adjustment area defined by conical area 34. By means of this information the regulator can position the strut in the adjustment area and adjust the desired position. By means of this simple type of mechanical signal intensification it is possible on the one hand to use a sensor 50 with a very short stroke (working stroke of strut ±50 mm; stroke of displacement indicator ±5 mm). On the other hand the mechanical feedback loop 52 can be positioned in such manner that it can easily be changed.

Figure 3:
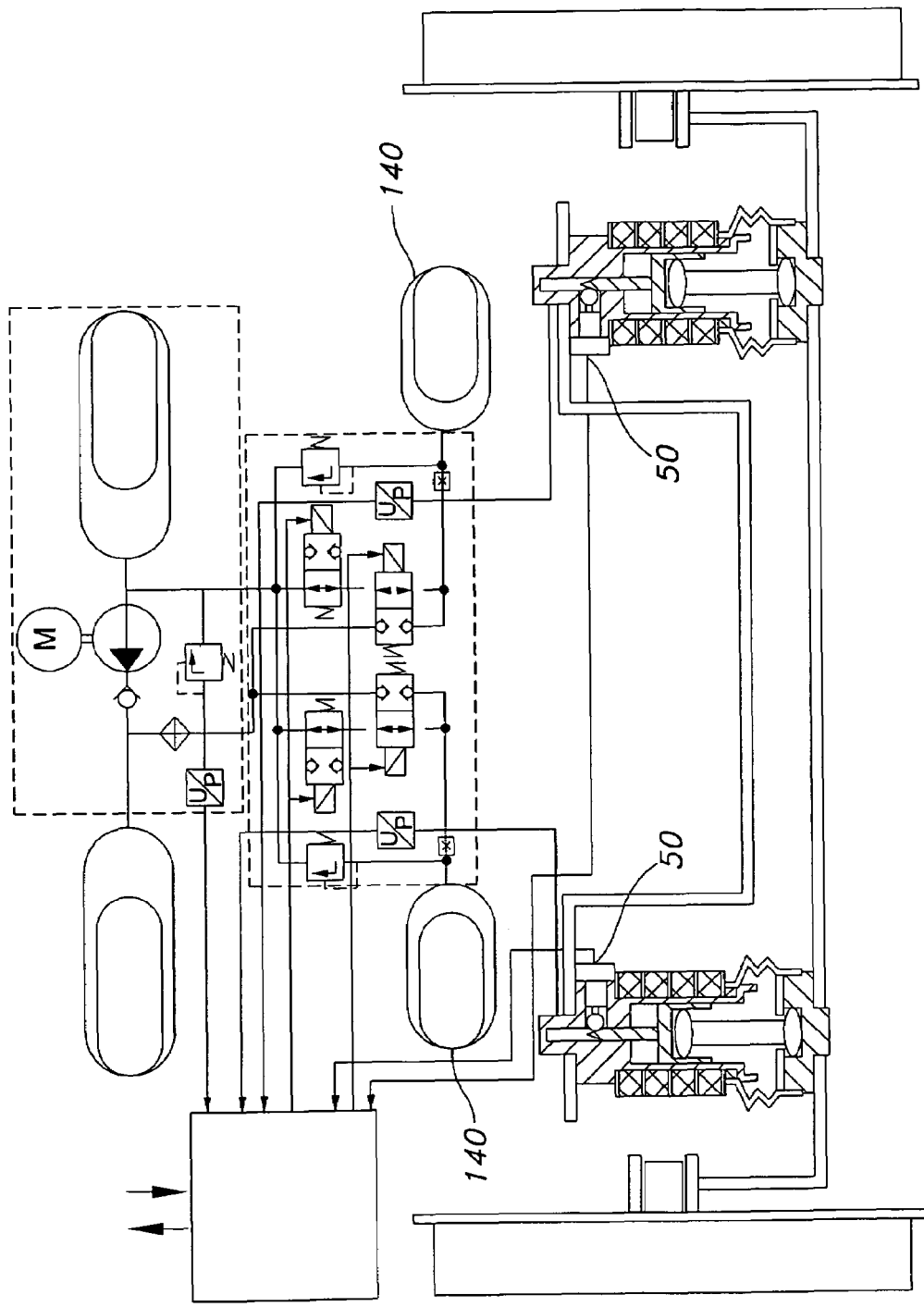
FIG. 3: System graph of the electronic regulation of the piston position of a hydropneumatic strut, in a first embodiment.

Adjustment is done by means of the hydraulic circuit visible in FIG. 3. If height sensor 50 reports that the current position of piston 30 does not accord with the desired value, the volume of oil in piston space 42 is increased or reduced. When piston space 42 or the hydraulic accumulator 140 connected with it is connected with the high-pressure accumulator, the volume of oil in piston space 42 is increased; when it is connected to the low-pressure accumulator, the volume of oil is decreased. HP strut piston space 42 is connected with hydraulic accumulator 140, which contains hydraulic fluid and a preloaded volume of nitrogen. There is a similar "nitrogen strut" in the high-pressure accumulator, into which oil is pumped from the low-pressure accumulator.

The magnetic valves are controlled by means of a control electronics to which the actual values of the piston position determined by the height sensors 50 are input.

The height is adjusted by means of the digital feedback loop illustrated in FIG. 3. If the actual value of the piston position determined by the height sensors 50 accords with the desired value, there is no change in the volume of oil, and the magnetic valves are in closed position. If the vehicle is too low, by means of the magnetic valves the high-pressure accumulator is connected with the piston space 42, which causes an increase in the quantity of oil in piston space 42, whereupon the vehicle is raised. If the vehicle is found to be too high, piston space 42 is connected via the magnetic valves with the low-pressure accumulator, and the necessary quantity of oil is removed from piston space 42.

It is possible by means of a change of software to achieve any desired adjustment algorithms. A primary spring equalization is also possible. The system also offers the possibility of automatically equalizing wheel diameter changes of up to 20 mm. (The wheel diameter is input via signal intensity indicator.) Diameter changes of more than 20 mm are equalized manually by means of a manual pump.

In the system illustrated in FIG. 3, the vehicle level is determined by means of two displacement indicators 52.

In the event of error (e.g. a drop in pressure in the hydraulic system of the HP strut), auxiliary spring 20 according to FIG. 1 takes over the cushioning role. When the quantity of oil in piston space 42 diminishes, ring 70 is positioned on stop plate 130. The movements of cylinder 40 and hence of the body or the bogie are then cushioned against stop plate 130 by means of auxiliary spring 20. In normal operation, auxiliary spring 20 is not engaged.

The adjustment unit 80 illustrated in FIG. 1 is activated to equalize wheel wear. This adjustment unit 80 has piston 100, the piston space 110 of which said piston 100 is acted upon by a hydraulic medium. Piston 100 is thereby moved upward, and the entire HP spring is moved upward by means of pendulum support 120, until the desired height is reached. After this adjustment procedure, the height sensor and the height of the auxiliary spring do not have to be re-adjusted.

Figure 2:
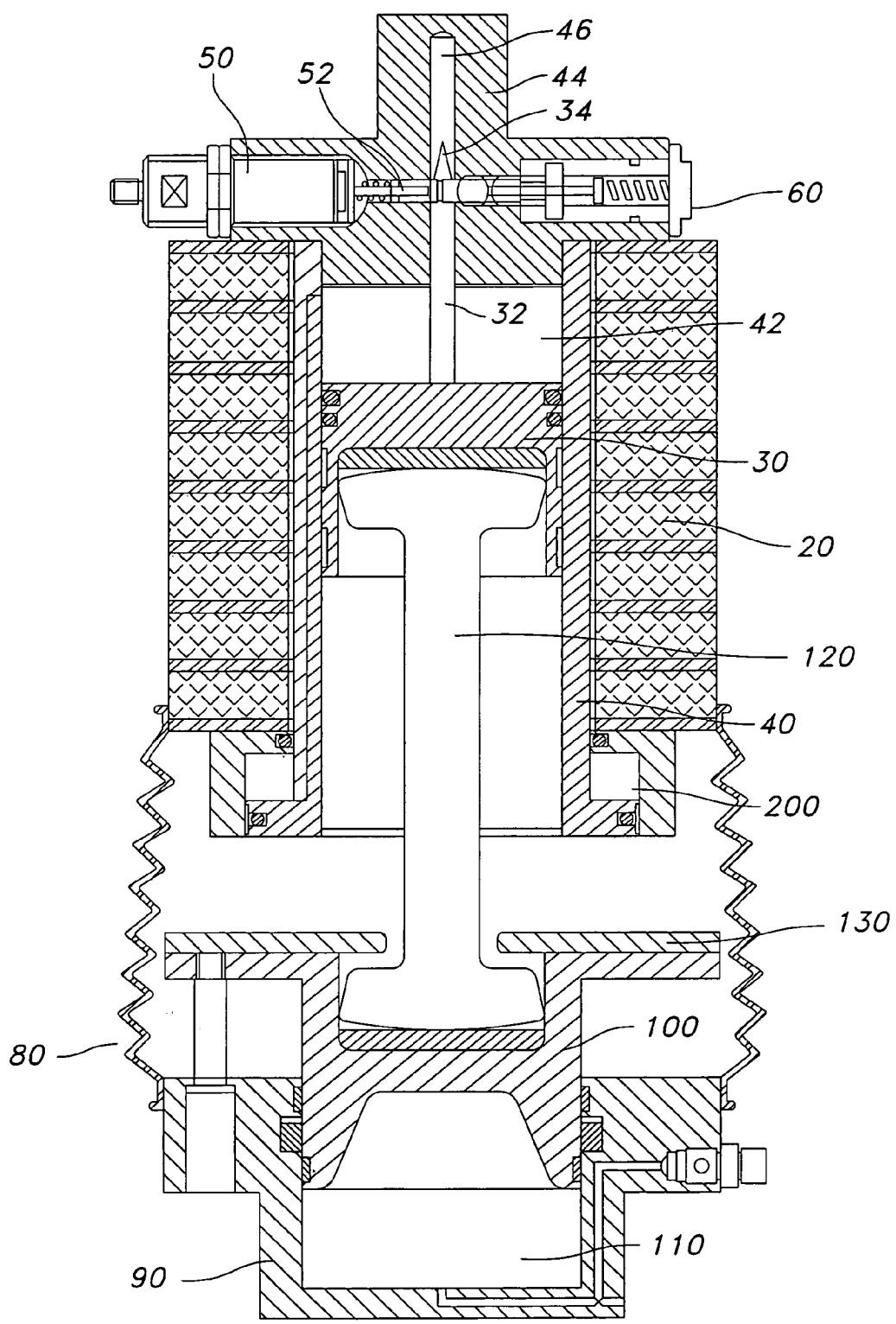
FIG. 2: Longitudinal section through an hydropneumatic strut with hydraulic end stop, in a first embodiment.

FIG. 2 shows an alternative embodiment of the HP strut, in which the design of the end plate of auxiliary spring 20 is hydraulic. FIG. 2 parts that are identical with FIG. 1 parts bear identical identification numbers. The hydraulic end plate encloses a hydraulic cylinder 200 that has its own pressure supply or is connected with the pressure system of the HP strut. By means of hydraulic cylinder 200, auxiliary spring 20 can be preloaded by any desired amount. In this embodiment, auxiliary spring 20 is preloaded to maximum vehicle weight. This creates the possibility of lowering the vehicle in normal operation below the auxiliary spring height, which is desired in certain applications. If the hydraulic pressure drops, the auxiliary spring automatically moves lower and is then available for auxiliary operation. When the hydraulic cylinder 200 (space B) is connected with piston space 42 (space A) of the HP spring, the auxiliary spring 20 is released when the pressure in piston space 42 falls.

FIG. 2 also shows adjustment unit 80 in a position in which piston 100 is moved upward in cylinder 90 by means of an appropriate pressure medium in piston space 110. By means of this arrangement, the equalization can be performed without difficulty. The entire strut is thereby moved upward. There is no need to re-adjust the height sensor or a height regulation valve, or to re-adjust the auxiliary spring height.

Figure 4:
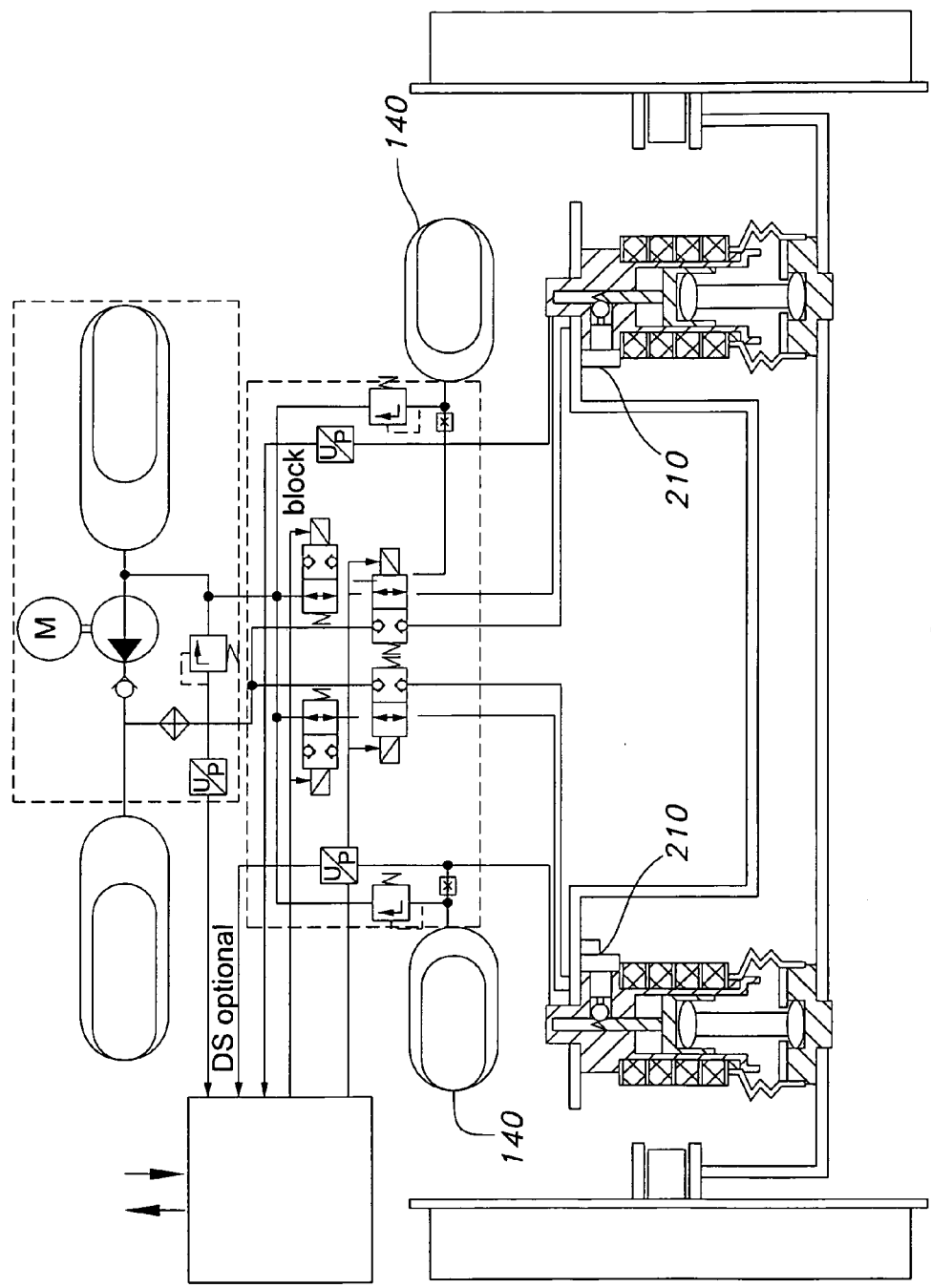
FIG. 4: System graph of the mechanical-hydraulic control of the piston position of a hydropneumatic strut, in a first embodiment.

FIG. 4 shows a system graph with mechanical-hydraulic regulation of the piston position of an HP strut according to FIG. 1. Instead of height sensor 50, a mechanical-hydraulic height regulator valve 210 is integrated into the HP strut. The advantage of this is that a separate feedback loop is not necessary. Valve 210 is connected with the high-pressure accumulator and also with the low-pressure accumulator, and by means of a mechanical feedback loop of piston 30 it regulates the volume of oil in piston space 42 until the vehicle height has accordingly achieved its desired value. This system is more cost-advantageous than the system illustrated in FIG. 1, but does not permit any primary spring equalization. The arrangement of the mechanical feedback loop as well as the design of the piston lug accord with the arrangement explained in FIG. 1.

Figure 5:
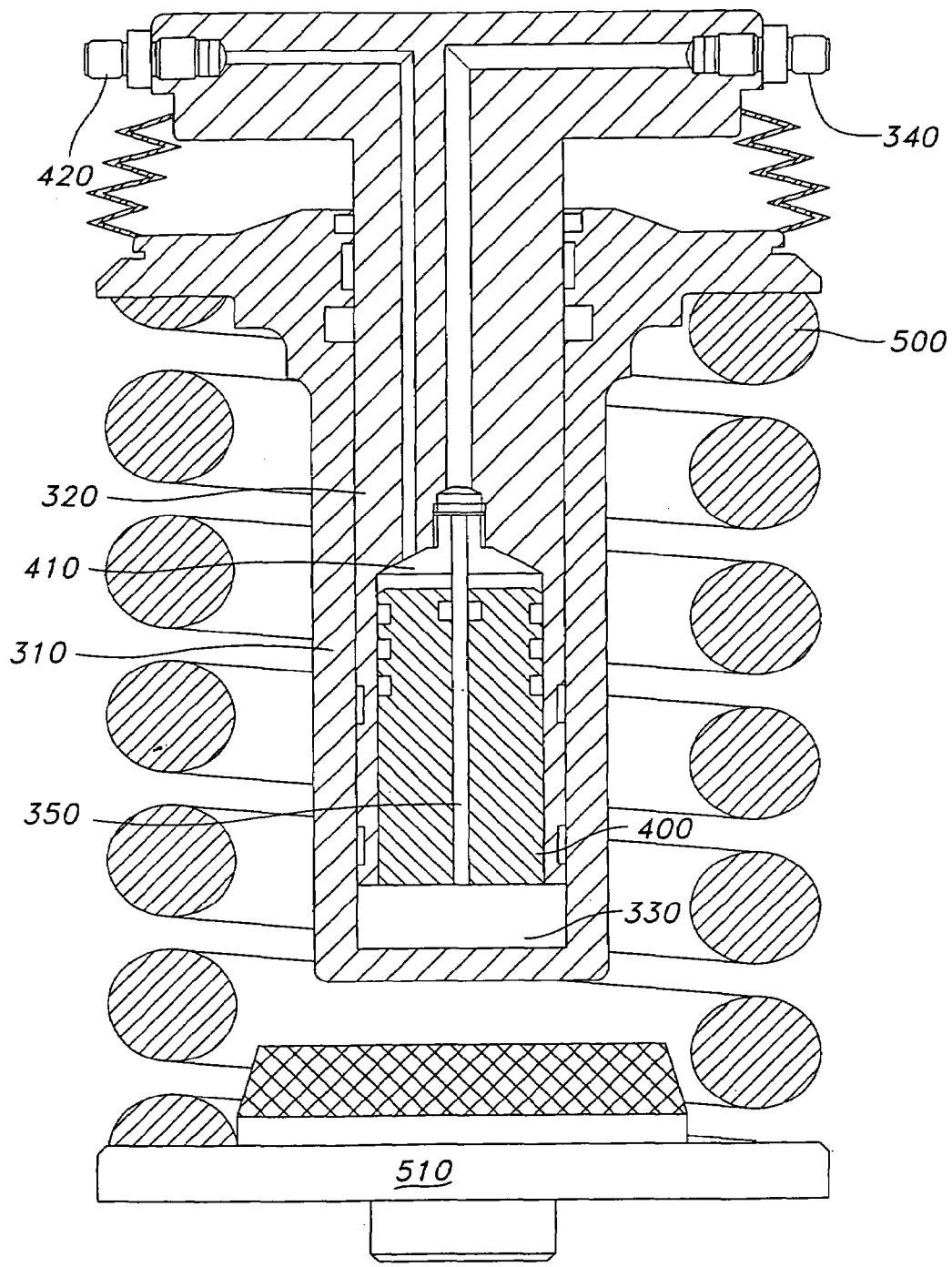
FIG. 5: Longitudinal section through a hydropneumatic strut, in a second embodiment.
Figure 6:
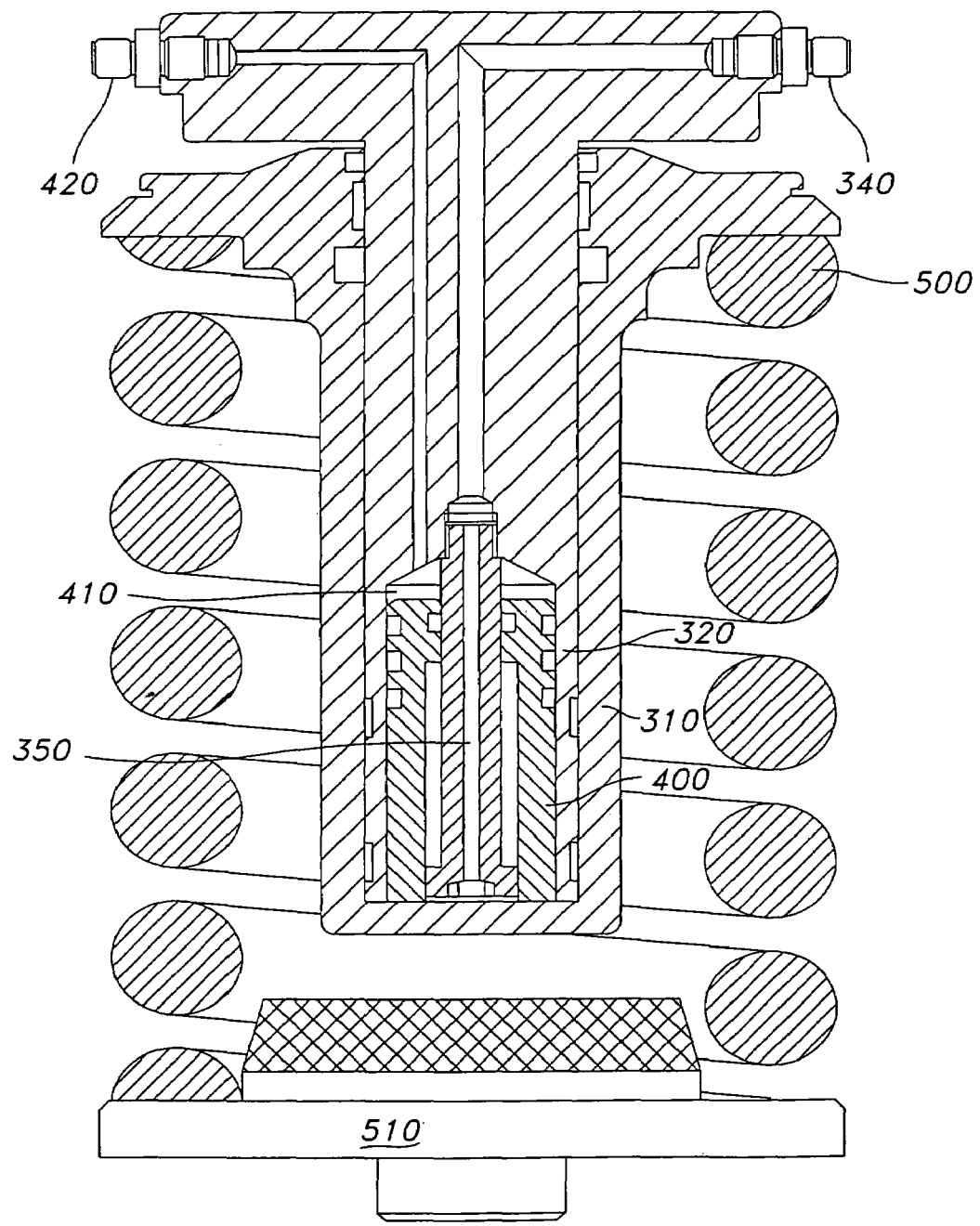
FIG. 6: Enlarged representation of a hydropneumatic strut, in a second embodiment.

FIGS. 5 and 6 show a longitudinal section through a spring element with HP strut in a second embodiment.

The HP strut encloses cylinder 310 as well as piston 320, housed to slide longitudinally in cylinder 310. The piston 320 end that faces piston space 330 has a recess that holds end stop 400. End stop 400 is designed to slide longitudinally relative to piston 320. Above end stop element 400 there is additional piston space 410 that via connection 420 can be impinged by a pressure fluid. This pressure fluid can, but does not have to, accord with the hydraulic medium of the HP strut, preferably oil. Piston space 330 is connected with the pressure supply of the HP strut. The connection with the pressure supply is designated by reference number 340.

Coil screw 500 is aligned with the HP strut that is supported on the one hand on a projection of cylinder 310 and on the other hand on an end plate 510. In normal operation of the vehicle, both spring elements, i.e. the HP spring and spring 500 engage, that is, they participate in the cushioning of the vehicle.

Figure 7:
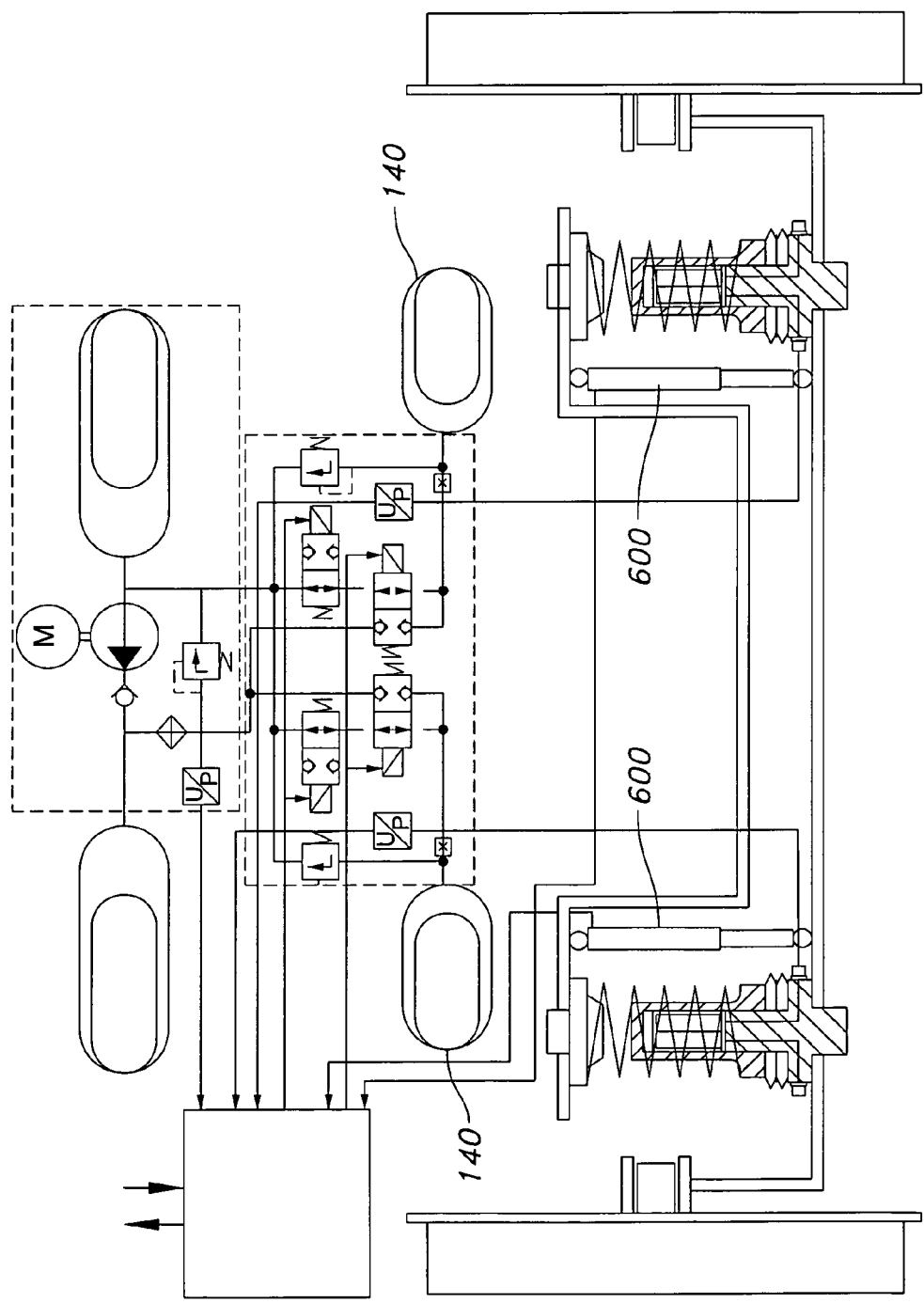
FIG. 7: System graph of the electronic control of the piston position of a hydropneumatic strut, in a second embodiment, with manual wheel wear equalization.

The desired vehicle height is regulated by means of the system configuration visible in FIG. 7. The oil volume in piston space 330 is adjusted to the desired value in the manner already explained in FIG. 3. A displacement measurement system 600 that is positioned next to the struts and which determines the height of the strut serves as indicator of the actual value.

As detailed in FIG. 5, and as is evident from the enlarged illustration according to FIG. 6, end-stop element 400 is positioned to slide longitudinally in the end of piston 320. For the purpose of wheel wear equalization, a hydraulic medium is introduced into piston space 410 located above end-stop element 400. By means of said hydraulic medium, piston 320 moves relative to end-stop element 40 and the vehicle height is increased accordingly. This corresponds to the auxiliary spring height that results when an error created by a loss of pressure in the HP strut occurs in the hydraulic system. Introduction of the hydraulic medium via connector 420 can be done manually with a manual pump or automatically by means of a feedback loop.

After adjustment of the auxiliary spring to the desired height, the hydraulic system is put into operation and the vehicle height is adjusted to the desired value. For this purpose hydraulic medium is introduced via line 350 into piston space 330, until the desired vehicle height is reached.

Figure 8:
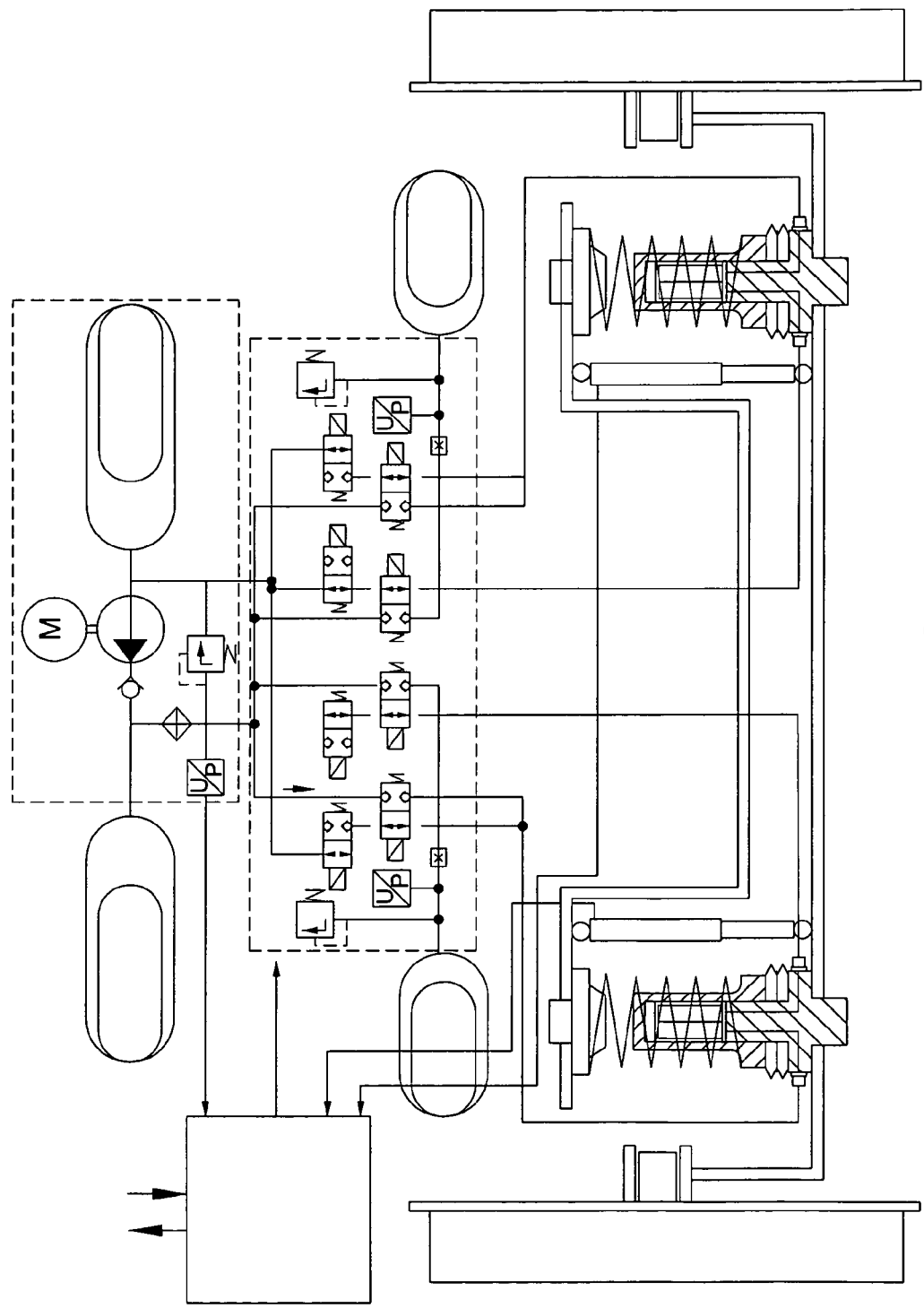
FIG. 8: System graph of the electronic regulation of the piston position of a hydropneumatic strut, in a second embodiment, with automatic wheel wear equalization.

FIG. 8 shows the hydraulic system with fully automatic wheel wear equalization. The wheel diameter is indicated via the signal intensity indicator. Each time the vehicle is set up, the adjustment electronic equipment automatically adjusts the height of the auxiliary spring to the predetermined wheel diameters.

The connection of piston space 410 to the high-pressure accumulator and to the low-pressure accumulator (broken line in FIG. 8) is evident from FIG. 8, and is achieved by means of the magnetic valve controlled by the control electronics.

In the event of an error that leads to a loss of pressure in the HP strut, end-stop element 400 is positioned on the end of cylinder 310. The cushioning effect is now provided by spring 500 alone. Thus it serves not only as active spring element during normal operations, but also as auxiliary spring element, so that another auxiliary spring is not inherently necessary.

Figure 9:
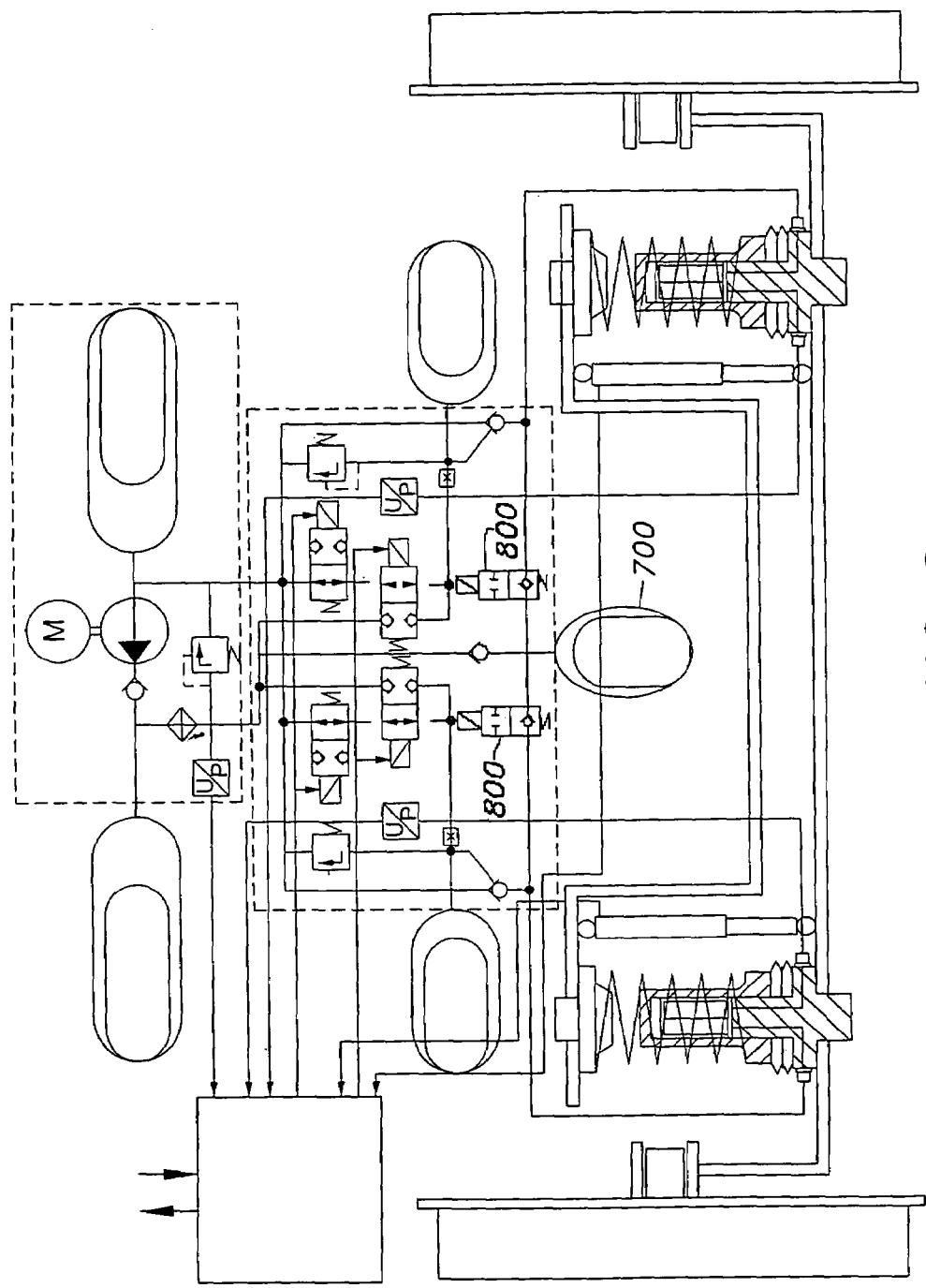
FIG. 9: System graph of the electronic regulation of the piston position of a hydropneumatic strut, in a second embodiment, with hydraulic auxiliary spring accumulator.

If during normal operation the vehicle drops below auxiliary spring height, the positioning of an hydraulically preloaded auxiliary spring is possible even in this embodiment of the spring element. FIG. 9 shows the corresponding hydraulic circuit diagram. Piston space 410 can be connected with an auxiliary spring accumulator 700, which contains a hydraulic medium under pressure as well as a compressible gas, preferably nitrogen, which preloads auxiliary accumulator 700. In normal operation, the connection between accumulator 700 and the struts is interrupted by means of appropriate setting position of the pressure valves 800. When normal hydraulic pressure prevails in the system, this pressure causes the pressure valves 800 to be moved downward into closed position and to be maintained in said position. If the pressure in the system drops, the spring-loaded pressure valves 800 open by means of change-over to the position shown in FIG. 9. In this position, accumulator 700 is connected with piston space 410, and hydraulic medium flows out of accumulator 700 into piston space 410. The piston is thereupon pushed to the end-stop limit, which causes the vehicle to be raised to auxiliary spring height. In normal system condition, the backflow is close to the piston; when there is no system pressure, the pressure of accumulator 700 is close to the piston.

The invention claimed is:

1. Spring element with a hydropneumatic strut to be positioned between a bogie and a body of a rail car,
   with the strut enclosing a sliding strut piston in a strut cylinder, whereby the strut piston or strut cylinder is connected with the bogie and other of the strut piston and the strut cylinder is connected with the body, and a strut cylinder piston space is connected with a hydraulic accumulator, wherein the spring element comprises an auxiliary spring which is concentrically arranged with the strut, encloses the strut cylinder, and is preloaded by a hydraulic cylinder which is connected with the strut cylinder piston space, wherein said spring element further includes a horizontally movable displacement indicator.

2. Spring element of claim 1 wherein the hydropneumatic strut has a hydraulic height regulator valve or a height sensor connected with a feedback loop, by means of which the position of the strut piston in the strut cylinder is adjusted or determined.

3. Spring element according to claim 2, wherein said height sensor or hydraulic height regulator valve is positioned above said strut piston and in a strut cylinder head mounted upon said strut cylinder.

4. Spring element according to claim 2, wherein the feedback loop is a mechanical feedback loop that emits a signal in a strut adjustment area, which said signal is dependent on the position of the strut piston.

5. Spring element according to claim 4, wherein the mechanical feedback loop emits, exclusively in the strut adjustment area, a signal dependent on the position of the strut piston, while the position of the mechanical feedback loop remains constant above and below the adjustment area.

6. Spring element according to claim 1, wherein the auxiliary spring is integrated into the strut in such a manner that the auxiliary spring does not increase the length of the, strut.

7. Spring element according to claim 6, wherein the auxiliary spring encloses the strut cylinder.

8. Spring element according to claim 1, wherein a bore extending in a longitudinal direction of the strut cylinder is positioned in a strut cylinder head, and the mechanical feedback loop of a height regulator valve or a height sensor is located in a bore extending perpendicular thereto in the strut cylinder head.

9. Spring element of claim 1 comprising an end-stop element that is designed to slide longitudinally in the direction of movement of the strut piston and by means of which the end position of the strut piston in the strut cylinder is changed.

10. Spring element with a hydropneumatic strut to be positioned between a bogie and a body of a rail car, with the strut enclosing a sliding strut piston in a strut cylinder, whereby the strut piston or strut cylinder is connected with the bogie and other of the strut piston and the strut cylinder is connected with the body, and a strut cylinder piston space is connected with a hydraulic accumulator, wherein the spring element comprises an auxiliary spring which is concentrically arranged with the strut, encloses the strut cylinder, and is preloaded by a hydraulic cylinder which is connected with the strut cylinder piston space, wherein the hydropneumatic strut has a hydraulic height regulator valve or a height sensor connected with a feedback loop, by means of which the position of the strut piston in the strut cylinder is adjusted or determined, wherein the strut piston has a lug with at least some conical sections, and the feedback loop is a mechanical feedback ioop that comes into contact with the surface of the lug at least in the conical area and undergoes a deflection dependent on the position of the lug.

11. Spring element with a hydropneumatic strut to be positioned between a bogie and a body of a rail car, with the strut enclosing a sliding strut piston in a strut cylinder, whereby the strut piston or strut cylinder is connected with the bogie and other of the strut piston and the strut cylinder is connected with the body, and a strut cylinder piston space is connected with a hydraulic accumulator, wherein the spring element comprises an auxiliary spring which is concentrically arranged with the strut, encloses the strut cylinder, and is preloaded by a hydraulic cylinder which is connected with the strut cylinder piston space, wherein the hydropneumatic strut has a hydraulic height regulator valve or a height sensor connected with a feedback loop, by means of which the position of the strut piston in the strut cylinder is adjusted or determined, and further comprising an adjustment unit, aligned with the strut, that is height adjusted in the direction of movement of the strut and which is supporting the strut piston or strut cylinder.

12. Spring element with a hydropneumatic strut to be positioned between a bogie and a body of a rail car, with the strut enclosing a sliding strut piston in a strut cylinder, whereby one of the strut piston or the strut cylinder is connected with the bogie and the other of the strut piston and strut cylinder is connected with the body, and a strut cylinder piston space is connected with a hydraulic accumulator, wherein the hydropneumatic strut has a hydraulic height regulator valve or a height sensor connected with a feedback loop and having a horizontally movable displacement indicator, by means of which the position of the strut piston in the strut cylinder is adjusted or determined, wherein the spring element includes an adjustment unit, aligned with the strut, that is height adjusted in the direction of movement of the strut and which is supporting the strut piston, and wherein the adjustment unit includes a hydraulic cylinder piston introduced into a hydraulic cylinder, height-adjustable in the direction of movement of the strut, and supporting the strut piston.

13. Spring element according to claim 12, comprising an equalizer pendulum one end of which is connected with the strut piston and the other end of which is connected with the hydraulic cylinder piston, the ends of the equalizer pendulum being spherical, to facilitate a movement of the strut crossways to the direction of movement of the strut piston and hydraulic cylinder piston.

14. Spring element with a hydropneumatic strut to be positioned between a bogie and a body of a rail car, with the strut enclosing a sliding strut piston in a strut cylinder, whereby the strut piston or strut cylinder is connected with the bogie and other of the strut piston and the strut cylinder is connected with the body, and a strut cylinder piston space is connected with a hydraulic accumulator, wherein the spring element comprises an auxiliary spring which is concentrically arranged with the strut, encloses the strut cylinder, and is preloaded by a hydraulic cylinder which is connected with the strut cylinder piston space, and comprising an adjustment unit, aligned with the strut, that is height adjusted in the direction of movement of the strut and which is supporting the strut piston.

15. Spring element with a hydropneumatic strut to be positioned between a bogie and a body of a rail car, with the strut enclosing a sliding strut piston in a strut cylinder, whereby the strut piston or strut cylinder is connected with the bogie and other of the strut piston and the strut cylinder is connected with the body, and a strut cylinder piston space is connected with a hydraulic accumulator, wherein the spring element comprises an auxiliary spring which is concentrically arranged with the strut, encloses the strut cylinder, and is preloaded by a hydraulic cylinder which is connected with the strut cylinder piston space, wherein the hydropneumatic strut has a hydraulic height regulator valve or a height sensor connected with a feedback loop, by means of which the position of the strut piston in the strut cylinder is adjusted or determined wherein said height sensor or hydraulic height regulator valve is positioned above said strut piston and in a strut cylinder head mounted upon said strut cylinder, and wherein said height sensor or hydraulic height regulator valve comprises a displacement indicator arranged therein to be movable substantially horizontally.

16. Spring element according to claim 15, wherein said strut cylinder head comprises an upwardly-extending bore and said strut piston comprises a lug extending upwardly therefrom and having a conically-tapering upward end arranged to be movably mounted within said bore, such that during operation, said displacement indicator calipers a surface of said conically-tapering end of said lug.

* * * * *